(12) United States Patent
Patil et al.

(10) Patent No.: US 12,497,186 B2
(45) Date of Patent: Dec. 16, 2025

(54) ELLIPTICAL ULTRASOUND VIBRATION BASED COOLING AND DEICING

(71) Applicant: Eaton Intelligent Power Limited, Dublin (IE)

(72) Inventors: Sandip Prakash Patil, Pune (IN); Makrand Narayan Yarolkar, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 107 days.

(21) Appl. No.: 18/542,029

(22) Filed: Dec. 15, 2023

(65) Prior Publication Data

US 2024/0199221 A1 Jun. 20, 2024

(30) Foreign Application Priority Data

Dec. 16, 2022 (IN) .............................. 202211072800

(51) Int. Cl.
*B64D 33/08* (2006.01)
*B06B 1/06* (2006.01)
*B64D 15/16* (2006.01)

(52) U.S. Cl.
CPC ................ *B64D 33/08* (2013.01); *B06B 1/06* (2013.01); *B64D 15/163* (2013.01); *B06B 2201/70* (2013.01)

(58) Field of Classification Search
CPC ...... B64D 33/08; B64D 15/163; B64D 27/34; B06B 1/06; B06B 2201/70; B06B 1/0603; B06B 1/0607
See application file for complete search history.

(56) References Cited

U.S. PATENT DOCUMENTS

2017/0113776 A1   4/2017 Johnson

FOREIGN PATENT DOCUMENTS

| CN | 202793087 U | 3/2013 | | |
|---|---|---|---|---|
| CN | 103175428 | 6/2013 | | |
| CN | 203190862 U | 9/2013 | | |
| CN | 105609475 A | 5/2016 | | |
| CN | 106288885 A | 1/2017 | | |
| CN | 206504649 U | 9/2017 | | |
| CN | 108871040 A | * 11/2018 | .............. | F28F 13/10 |
| CN | 208998627 U | 6/2019 | | |
| CN | 110816855 A | * 2/2020 | ............. | B64D 15/16 |

(Continued)

OTHER PUBLICATIONS

Extended European Search Report issued in corresponding Patent Application No. 23217364.1 Apr. 11, 2024.

*Primary Examiner* — Emmanuel E Duke
(74) *Attorney, Agent, or Firm* — Merchant & Gould P.C.

(57) ABSTRACT

A cooling system including a heat load; a supply line supplying a cold coolant to the heat load, wherein the cold coolant receives heat from the heat load and becomes a hot coolant, a return line receiving the hot coolant from the heat load, a transducer generating elliptical ultrasonic waves, and a horn coupled to the receiving line and receiving the hot coolant, wherein the horn conveys the elliptical ultrasonic waves to the hot coolant. The hot coolant, in response to the horn conveying the elliptical ultrasonic waves, undergoes heat loss through convection. Elliptical ultrasonic waves are provided by a transducer combining a longitudinal actuator and a bending actuator.

20 Claims, 4 Drawing Sheets

(56) References Cited

FOREIGN PATENT DOCUMENTS

| | | | |
|---|---|---|---|
| CN | 111702189 A | 9/2020 | |
| CN | 111765792 A | 10/2020 | |
| DE | 10136711 A1 | 2/2003 | |
| JP | 62033298 A | 8/1985 | |
| JP | 10153674 A | 11/1996 | |
| JP | 2008286503 A | 11/2008 | |
| JP | 2016057002 A | 4/2016 | |
| KR | 100468840 B1 * | 1/2005 | ......... H01L 23/3672 |

* cited by examiner

ELLIPTICAL ULTRASOUND VIBRATION BASED COOLING AND DEICING

CROSS-REFERENCE TO RELATED APPLICATION

This application claims the benefit of Indian Provisional Patent Application Serial No. 2022/11072800, filed on Dec. 16, 2022, the disclosure of which is incorporated herein by reference in its entirety.

BACKGROUND

Various components within an aircraft require thermal management to operate. For example, a propeller motor and a battery powering the propeller motor both generate heat during operation and can overheat (e.g., surpass an upper temperature limit) if left uncooled. Certain components, such as the battery, also may have a lower temperature limit to operate properly. Accordingly, the aircraft is equipped with a thermal management system including cooling circuits for these components.

Traditional liquid cooled thermal management systems include a heat exchanger as a primary medium to dispel heat. The heat exchanger requires a dedicated air or liquid cooled system. These systems are often heavy and take up significant real estate. In some contexts, such as aboard an aircraft, the weight and size of the cooling system can be difficult to accommodate.

SUMMARY

Examples provided herein are directed to a cooling system including a heat load; a supply line supplying a cold coolant to the heat load, wherein the cold coolant receives heat from the heat load and becomes a hot coolant; a return line receiving the hot coolant from the heat load; a transducer generating elliptical ultrasonic waves; and a horn coupled to the receiving line and receiving the hot coolant, wherein the horn conveys the elliptical ultrasonic waves to the hot coolant. In other examples provided herein, the hot coolant, in response to the horn conveying the elliptical ultrasonic waves, undergoes heat loss through convection.

In certain implementations, the transducer comprises at least two actuators. In certain examples, the at least two actuators include a longitudinal actuator. In certain examples, the at least two actuators include a bending actuator. In still further examples, the at least two actuators include both a longitudinal actuator and a bending actuator.

In certain examples, the transducer generates elliptical ultrasonic waves with a frequency of at least 20 kHz. In further examples, the transducer generates elliptical ultrasonic waves with a frequency in the range of 20-100 kHz. In other examples, the transducer generates elliptical ultrasonic waves with an amplitude of no more than 20 micrometers. In further examples, the transducer generates elliptical ultrasonic waves with an amplitude in a range of 2-20 micrometers. In still further examples, the transducer generates elliptical ultrasonic waves with a frequency in the range of 20-100 kHz.

In other examples provided herein, the system further includes a surface subject to ice formation, wherein the horn is coupled to the surface and conveys the elliptical waves to the surface.

Examples provided herein are further directed to a system for ice removal including an ultrasonic generator; a transducer, powered by the ultrasonic generator, providing elliptical ultrasonic waves; and a horn coupled to a surface subject to ice formation and conveying the elliptical waves to the surface. In other examples, the surface is a wing surface. In further examples, the horn is coupled to the wing surface such that the horn is internally mounted on the wing. In other further examples, the horn is coupled to the wing surface such that the horn is externally mounted on the wing.

Examples provided herein are further directed to a method of supplying cooling using elliptical ultrasound vibrations including receiving, by a horn via an integrated coolant line, a return of a heated coolant from a heat source; and conveying, by the horn, elliptical ultrasonic waves from a transducer to the heated coolant, wherein the transducer comprises a bending transducer and a longitudinal transducer.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to the use of elliptical ultrasonic vibrations to create a convective cooling effect for hot fluid returning from a source. More specifically the present disclosure describes the use of elliptical ultrasonic vibrations, instead of traditional linear ultrasonic vibrations. The elliptical vibrations create a swirling effect on droplets of the liquid to be cooling. The swirling provides for heat loss by convection.

The present disclosure provides for the use of high frequency ultrasonic vibrations, such as with a small amplitude and in elliptical directions, which reduces the static contact between the fluid and a tube surface by inducing oscillations. By reducing this static contact, the fluid can more effectively release heat, enabling a more efficient and compact system than traditional heat exchangers. The vibration induced can also be used for deicing function when it is an integrated part of a surface structure.

Use of elliptical ultrasonic vibrations provides advantages of traditional linear ultrasonic vibrations. Elliptical ultrasonic vibrations may be achieved by the combination of at least two actuators propagating ultrasonic waves is two different directions. For example, ultrasonic waves may be generated in two directions, perpendicular to one another, such that the intersecting ultrasonic waves produce an overall elliptical waveform.

The swirling motion created by the elliptical waveform increases the intermittent contact between fluid droplets and the tube surface leading to enhanced heat loss. The elliptical ultrasonic waves are directed are line or pipes containing hot coolant. When experiencing the elliptical ultrasonic waves, particles of the hot coolant move away from the walls of the pipe and away from one another. The resulting swirling motion of the particles creates space between the particles into which heat may be lost through convection.

Systems embodying the present disclosure may directly replace a tradition fluid-based thermal management system. For example, a horn and transducer may be installed in the place of a heat exchanger. In other examples, systems embodying the present disclosure may integrate with an existing thermal management system. For example, a horn and transducer may be installed alongside or compatible with a heat exchanger.

Figure 1:
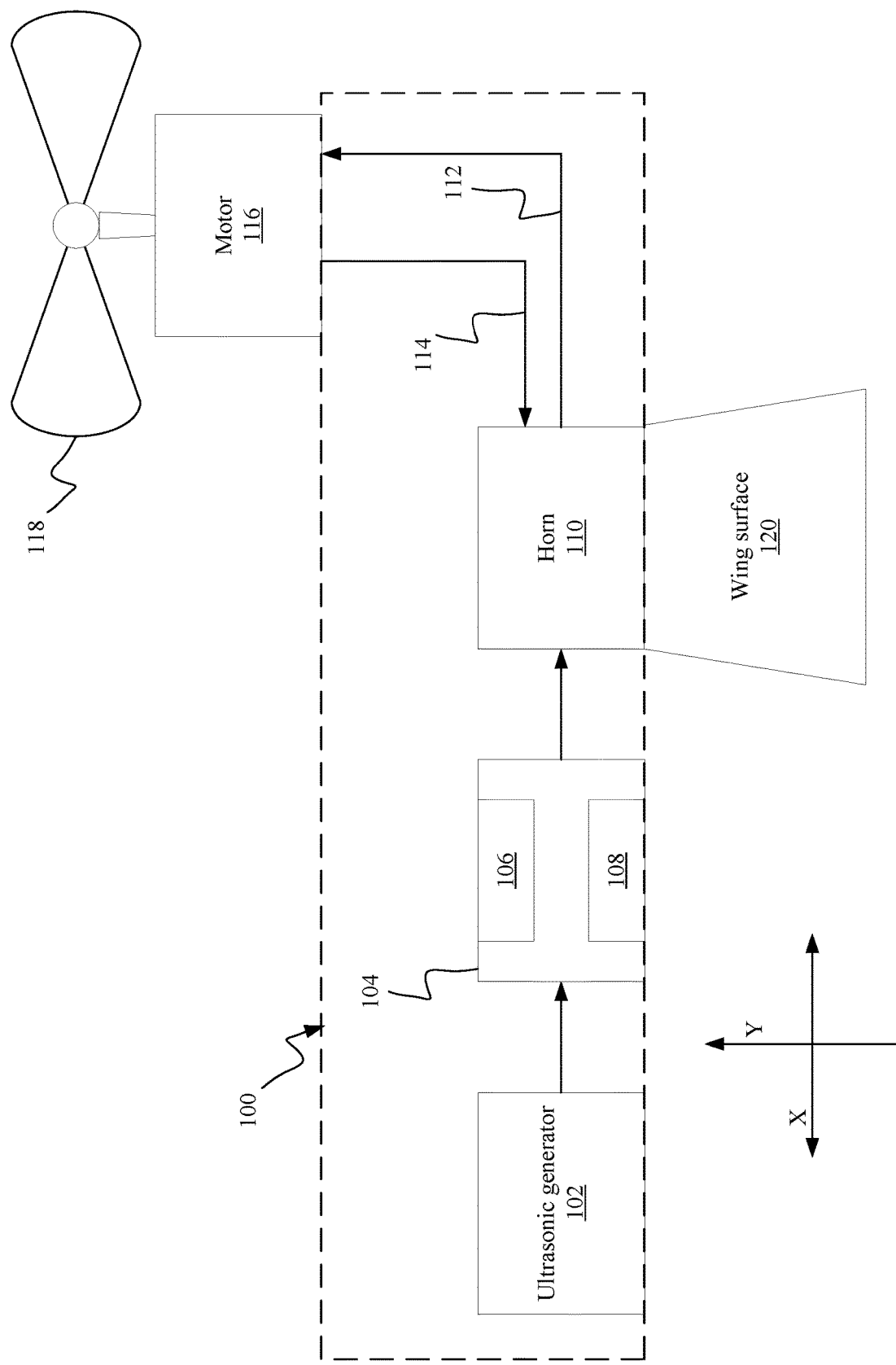
FIG. 1 is an example system for using elliptical ultrasound vibration to provide cooling and/or deicing.

Referring now to FIG. 1, shown is an example system 100 for using elliptical ultrasound vibration to assist in cooling a heat load such a motor 116 and propeller 118 and/or deicing to a wing surface 120. System 100 may be a thermal management system and/or a deicing system. System 100 comprises an ultrasonic generator 102, a transducer 104 including a bending actuator 106 and a longitudinal actuator 108, a horn 110, a cold coolant supply line 112, and a hot coolant return line 114.

System 100 is an example system providing both thermal management and deicing capability with a single common system. In embodiments, a system according to the present disclosure may provide only one or the other of cooling or deicing. In one example, a thermal management system according to the present disclosure may provide cooling and a separate de-icing system according to the present disclosure may provide deicing. A system according to the present disclosure may be used to supply cooling and an alternative system may be used to accomplish deicing or the system according to the present disclosure may be applied in a context where deicing is not required, such as cooling motors and other heat loads in a system maintained in an interior controlled environment.

Example system 100 demonstrates implementation of the principles of the present disclosure in the context of an airplane wing. By example, a cooling system according to the present disclosure may be used to provide cooling to a propeller motor. Other examples of cooling system loads include inverters and batteries. By example, a deicing system according to the present disclosure may be used to deice the wing of an aircraft. Cooling and deicing may be provided by a shared system, such that a shared horn or emitter transmits elliptical ultrasonic waves to both a hot coolant and a surface subject to ice formation. In examples, cooling and deicing may be provided by a common system but by separate horns, such that a first horn is mounted to a surface to provide deicing and a second horn receives coolant lines to provide cooling.

Ultrasonic generator 102 produces electrical current at a specified power rating. This current is used to supply transducer 104 for the generation of ultrasonic waves. Transducer 104 converts electrical energy received from ultrasonic generator 102 into sound energy. Transducer 104 is configured to produce sound energy with an elliptical waveform. Transducer 104 performs this conversion by vibrating mechanically at ultrasound frequencies in response to the application of power at a specified power rating. Transducer 104 may be an electromechanical transducer, such as a piezoelectric transducer.

"Ultrasound" generally refers to frequencies greater than 20 kHz. Transducer 104 may be particularly configured to produce ultrasonic waves with a high frequency. In embodiments, transducer 104 may produce waves at a frequency of at least 20 kHz, 20-40 kHz, 20-60 kHz, 20-80 kHz, 20-100 kHz, or 20-120 kHz. Transducer 104 may be particularly configured to produce ultrasonic waves at a small amplitude. In embodiments, transducer 104 may produce waves at an amplitude of no more than 25 micrometers, no more than 20 micrometers, 15-20 micrometers, 10-20 micrometers, 5-20 micrometers, 2-20 micrometers, or 1-20 micrometers.

Soundwaves generally propagate by longitudinal motion, such as compression and expansion, rather than transverse motion (e.g., side-to-side). Transducer 104 is configured to produce elliptical ultrasonic waves. The configuration may be achieved by providing ultrasonic waves in at least two directions. In embodiments, the two directions may be perpendicular to one another. For example, transducer 104 incorporates a bending actuator 106 and a longitudinal actuator 108. Each actuator generates ultrasonic waves along a particular axis. For example, longitudinal actuator 108 may propagate waves along the x-axis direction of FIG. 1 and bending actuator 106 may propagate waves along the y-axis direction of FIG. 1. Together, bending actuator 106 and longitudinal actuator 108 propagate an elliptical ultrasonic wave which is emitted or amplified by horn 110.

Bending actuator 106 may be configured to propagate ultrasonic waves in a first direction, such as in a direction parallel to the y-axis of FIG. 1. In examples, bending actuator 106 is a two-layer piezoelectric actuator that produces curvature when one piezo layer expands while the other layer contracts. Longitudinal actuator 108 may be configured to propagate ultrasonic waves in a second direction, such as in a direction parallel to the x-axis of FIG. 1. One or both of bending actuator 106 and longitudinal actuator 108 may be a lead-zirconium-titanium oxide (PZT) actuator, such as a PZT thin-film actuator, or another piezoelectric ceramic or other material with high piezoelectric constants, such as quartz.

Horn 110 emits the elliptical ultrasound waves produced by transducer 104, conveying the waves into the target medium. In a cooling context the target medium is the hot coolant received from a heat source, such as motor 116. In embodiments, the shape of horn 110 may be configured based on accommodation of cooling line such as cold coolant supply line 112 and hot coolant return line 114. In an example, horn 110 may be cylindrical in shape. In embodiments, horn 110 may incorporate or also function as a boost and amplify elliptical ultrasonic vibrations received from transducer 104.

Cold coolant supply line 112 supplies cold or cooled coolant to the system heat load, such as motor 116. Hot coolant return line 114 brings coolant which has received heat from the system heat load, such as motor 116, back to horn 110 to be cooled. Hot coolant return line 114 may be fully received by horn 110 to provide effective transmission of the elliptical ultrasonic waves to the hot coolant in hot coolant return line. Hot coolant return line 114 may be coupled to cold coolant supply line 112 such that as hot coolant in hot coolant return line 114 is cooled it also enters cold coolant supply line 112 for reuse. In an example, hot coolant return line 114 and cold coolant supply line 112 may be a common coolant line, and transition from a hot coolant return line to a cold coolant supply line as the line passes into and out of the horn 110 and the hot coolant is cooled.

As the hot coolant travels through the horn, the elliptical ultrasonic waves are conveyed to the particles of the coolant. As these particles experience elliptical movement in response to the elliptical ultrasonic waves, heat is lost by the particles due to convection. In examples implementing the system 100 in the context of an aircraft, horn 110 may be oriented directly or nearly under the rotor blades to use the airflow generated by the rotor in forced convection. In embodiments, an independent fan may be used to generated airflow for forced convention.

Motor 116 represents a load on the cooling system. Propeller 118 represents a load driven by motor 116. Heat generated by motor 116 in driving propeller 118 is transferred to incoming cold coolant and the hot coolant is then returned to horn 110 to be cooled using the elliptical ultrasonic waves. Example system 100 applies the principles of the present disclosure in the context of an aircraft, wherein the load on the cooling system of a motor driving a propeller to provide propulsion to the aircraft. Those of skill in the art will recognize that the principles of the present disclosure will be applicable to cooling systems in other contexts as well.

Wing surface 120 is an example surface upon which system 100 may be applied in a deicing application. In embodiments, the effectiveness of the system in a deicing application may be increased when the horn is in contact with the surface to be deiced. Contact between the horn 110 and the wing surface 120 supports the conveyance of the elliptical sound waves from the horn 110 to the surface 120. The horn 110 may be mounted internally within the wing. The horn may be mounted externally on the wing. The elliptical ultrasonic waves can break up existing ice crystals and disrupt the formation of new ice crystals, thus providing effective deicing.

Figure 2:
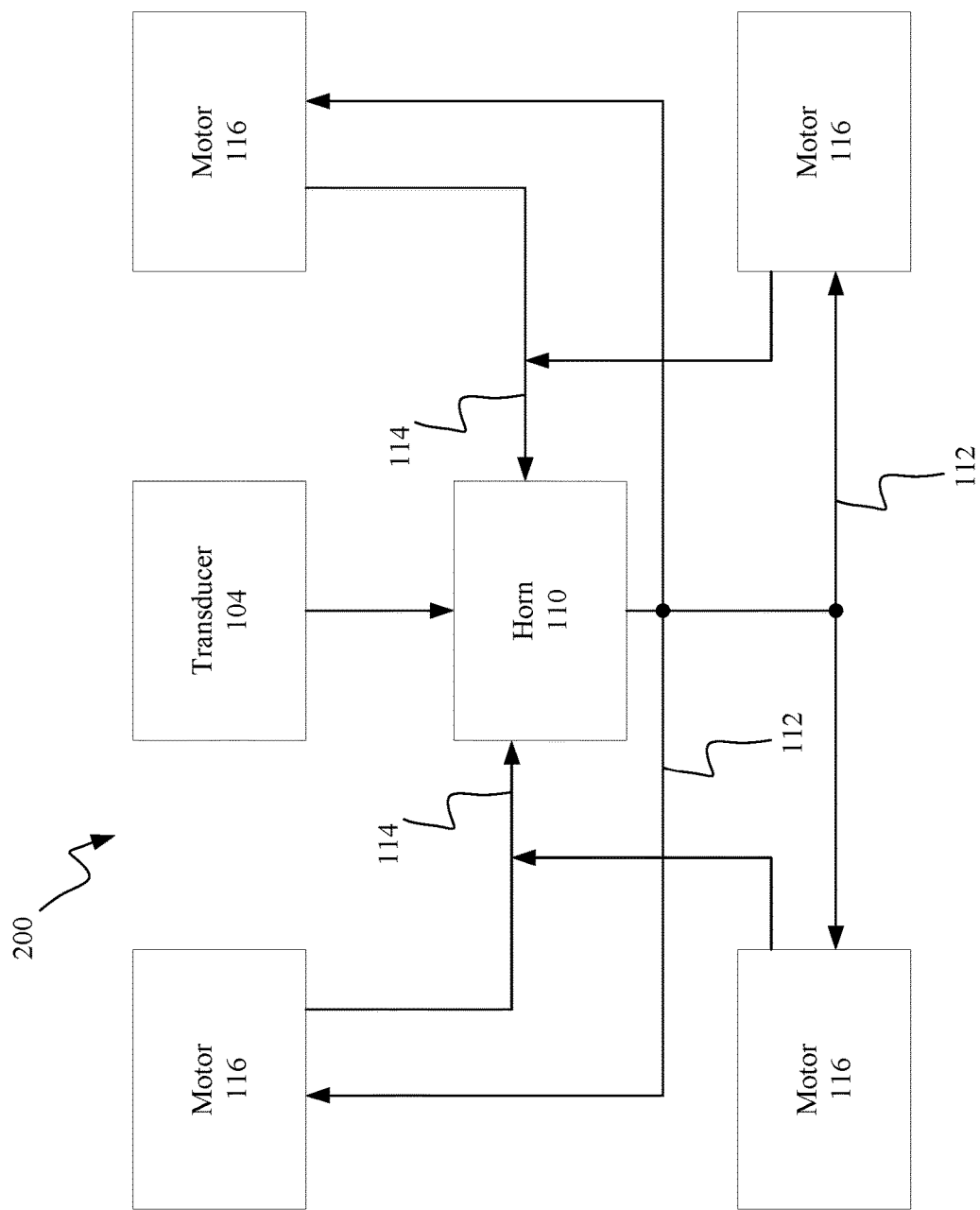
FIG. 2 is an example system for using elliptical ultrasound vibration to cool a plurality of loads.

Example system 100 demonstrates the principles of the present disclosure in a system with a single load, but the same principles can be applied effectively in systems with multiple heat loads or surfaces for deicing. For example, in the context of an aircraft, there may be four propeller motors to cool spread across two wings of the aircraft. A common system per wing may be implemented, wherein a single horn cools coolant from each of two motors on the wing. The same horn may be mounted to the interior of the wing to simultaneously provide deicing. In another example, such as example system 200 of FIG. 2, a single horn can be sized to accommodate and cool coolant from at least four motors. The example system 200 depicts four example heat loads, though any number of heat loads may be placed on the system with a properly sized and configured horn.

For example, a propeller arrangement may include an inverter in addition to a motor to operate the propeller. One, two, three, or more propeller arrangements may be disposed on each wing of an aircraft. Each wing may contain additional propulsion components that additional generate heat and may be cooled by the cooling system disclosed herein. For example, each propeller arrangement may be powered by a power system including a battery via a bus. The power system may include a supercapacitor, and cooling the batter may include cooling the supercapacitor. Propeller arrangements may be powered by a main battery, which may be oriented, for example, in the fuselage. Propeller arrangements may be powered by one or more batteries that may be distributed along the wing and other area of the aircraft.

The power system may also provide electric power to other components of the aircraft such as the flight management system, the control display unit, lighting within the cabin, fans of the HVAC system, a heating element of an HVAC system to heat the air within the cabin, and/or a heating element of a de-icing arrangement disposed at the wings to melt ice. In certain implementations, the power system also provides electric power to one or more components of a thermal management system used to cool the battery and/or other components such as the propeller arrangement. In examples disclosed herein, the de-icing arrangement and the thermal management system may be a single system.

In examples, a thermal management system embodying the present disclosure may include one or more cooling circuits that cool various components of the aircraft.

The thermal management system may include a battery cooling circuit configured to cool one or more batteries of the power system, a first propeller arrangement cooling circuit configured to cool one or more of the propeller arrangements of a first wing, and a second propeller arrangement cooling circuit configured to cool one or more of the propeller arrangements of a second wing. In other examples, each propeller arrangement may have a corresponding propeller arrangement cooling circuit. In other examples, each wing may have one or more propeller arrangements with a respective battery and battery cooling circuit.

Figure 3:
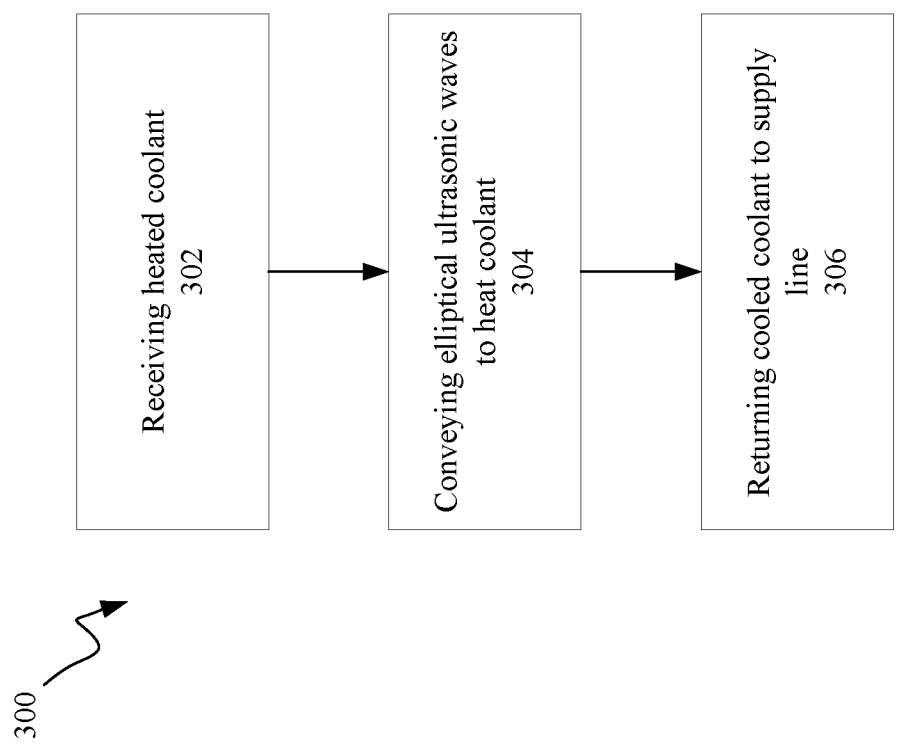
FIG. 3 is a flowchart of an example method for using an elliptical ultrasonic vibration based cooling system.

FIG. 3 is a flowchart of an example method 300 for using an elliptical ultrasonic wave based cooling system. Method 300 may be performed by an elliptical ultrasonic wave based cooling system such as example system 100 of the FIG. 1 or example system 200 of FIG. 2.

At 302, heated coolant is received at a horn. The horn is in communication with a transducer configured to produce high frequency and low amplitude elliptical ultrasonic waves. The horn may be configured to boost or amplify the ultrasonic waves received from the transducer. The transducer may be configured to produce elliptical ultrasonic waves by incorporate of two or more actuators. In one example, the transducer incorporates a first actuator, and a longitudinal actuator. The longitudinal actuator propagates ultrasonic waves in a first direction, such as parallel to a path from the transducer to the horn. The transducer may further incorporate a second actuator, such as a bending actuator. The bending actuator propagates ultrasonic waves in a second direction, such as perpendicular to the path from the transducer to the horn. The interaction of the propagated waves from the two actuators results in an elliptical ultrasonic wave reaching the horn.

At 304, the horn transmits the high frequency and low amplitude ultrasonic waves to the heated coolant. The ultrasonic waves may be applied to pipes integrated with or running through the horn. The coolant may be flowing through the pipes and experience the elliptical ultrasonic waves by transmission from the horn and through the pipes. As the coolant experiences the ultrasonic wave, the static force between the coolant and the walls of the pipe is reduced and the particles of the coolant oscillate in response to the elliptical ultrasonic wave, and the coolant undergoes heat loss through convection. As the coolant passes through the horn, it loses heat and moves toward a coolant supply line.

At 306, the cooled coolant is returned to the supply line. The supply line may be continuous with the return line, such that the transition from return to supply line occurs as the coolant flows through the horn and is cooled by convection.

Figure 4:
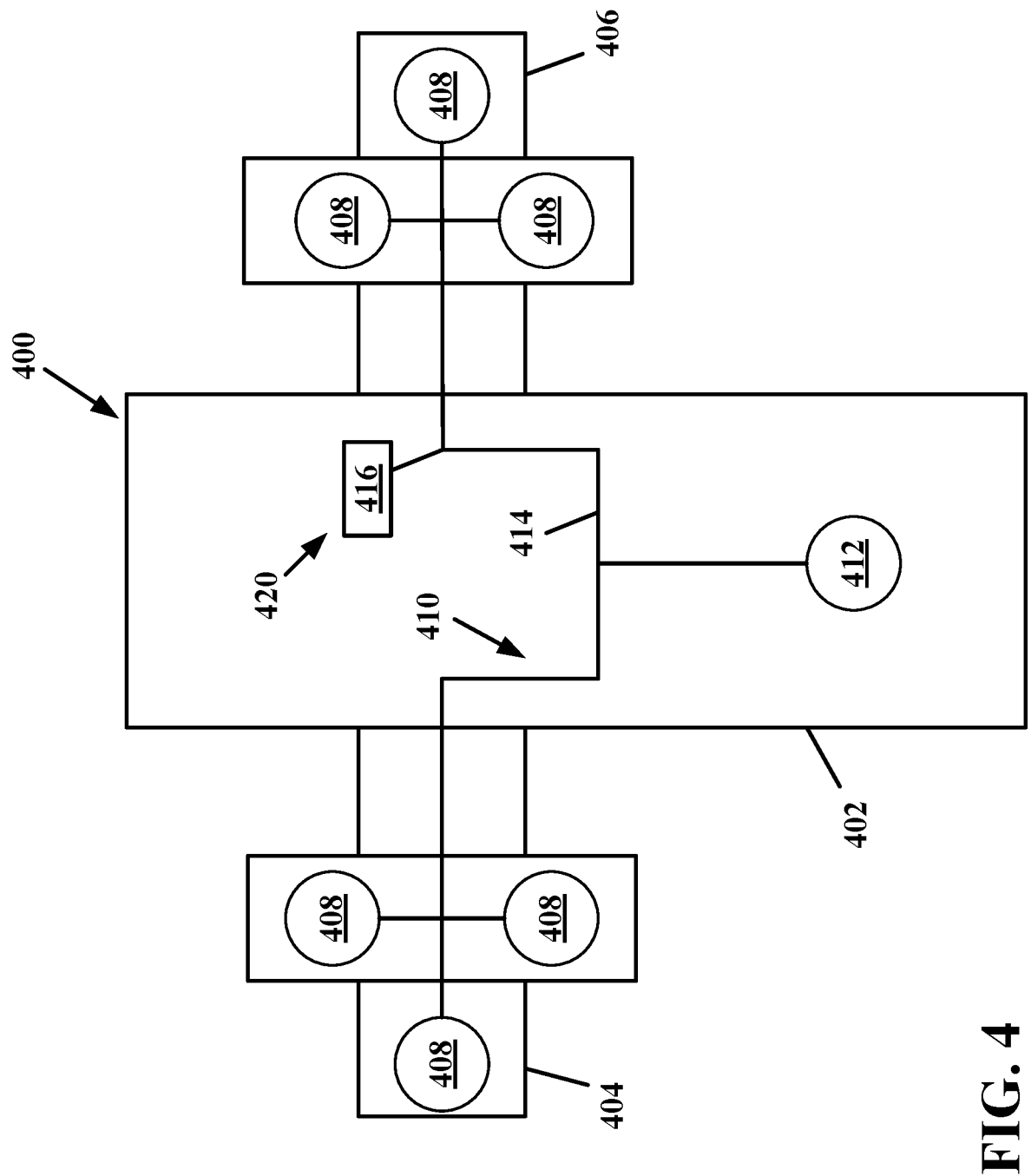
FIG. 4 is a schematic diagram of an example aircraft power system.

FIG. 4 is a schematic diagram of an example aircraft power system. The example aircraft power system represents an environment in which the thermoregulation system of the present disclosure may be implemented. Various components of FIG. 4 may be heat loads served by a thermal management system according to the present disclosure.

An aircraft 400 includes a fuselage 402 defining a cabin sized to carry a pilot and one or more passengers. The aircraft 400 also includes a first wing 404 and a second wing 406 that each carry one or more propeller arrangements 408 or other propulsion components. In the example shown, three propeller arrangements 408 are disposed at each wing 404, 406. In other examples, however, each wing 404, 406 may carry any desired number or propulsion components. In certain examples, each propeller arrangement 408 includes a propeller, a motor, and an inverter to operate the propeller arrangement 408. Other configurations are possible.

The aircraft 400 includes a power system 410 including at least one battery 412 that powers the propeller arrangements 408 via a power bus 414. In the example shown, the propeller arrangements 408 are powered by a main battery 412 carried by the fuselage 402. In other examples, the propeller arrangements 408 may be powered by one or more batteries 412 carried by the wings 404, 406. In certain implementations, the power system 410 also provides electric power to other components of the aircraft such as the flight management system, the control display unit, and/or lighting. In certain implementations, the power system 410 also provides electric power to one or more components 416 (e.g., a compressor, a pump, etc.) of a thermal management system 420 used to cool the battery 412 and/or other components such as the propeller arrangement 408. Thermal management system 412 may be a thermal management system such as system 100 of FIG. 1 or any other thermal management system described herein.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A cooling system comprising:
   a heat load;
   a supply line supplying a cold coolant to the heat load, wherein the cold coolant receives heat from the heat load and becomes a hot coolant;
   a return line receiving the hot coolant from the heat load;
   a transducer generating elliptical ultrasonic waves; and
   a horn coupled to the return line and receiving the hot coolant, wherein the horn conveys the elliptical ultrasonic waves to the hot coolant.

2. The cooling system of claim 1, wherein the hot coolant, in response to the horn conveying the elliptical ultrasonic waves, undergoes heat loss through convection.

3. The cooling system of claim 1, wherein the transducer comprises at least two actuators.

4. The cooling system of claim 3, wherein the at least two actuators comprises a longitudinal actuator.

5. The cooling system of claim 3, wherein the at least two actuators comprises a bending actuator.

6. The cooling system of claim 3, wherein the at least two actuators comprises a longitudinal actuator and a bending actuator.

7. The cooling system of claim 1, wherein the transducer generates the elliptical ultrasonic waves with a frequency of at least 20 kHz.

8. The cooling system of claim 7, wherein the transducer generates the elliptical ultrasonic waves with a frequency in the range of 20-100 kHz.

9. The cooling system of claim 1, wherein the transducer generates the elliptical ultrasonic waves with an amplitude of no more than 20 micrometers.

10. The cooling system of claim 9, wherein the transducer generates the elliptical ultrasonic waves with an amplitude in a range of 2-20 micrometers.

11. The cooling system of claim 1, wherein the transducer generates the elliptical ultrasonic waves with a frequency in a range of 20-100 kHz.

12. The cooling system of claim 1, further comprising:
    a surface subject to ice formation, wherein the horn is coupled to the surface and conveys the elliptical ultrasonic waves to the surface.

13. A system for ice removal comprising:
    an ultrasonic generator;
    a transducer, powered by the ultrasonic generator, providing elliptical ultrasonic waves; and
    a horn coupled to a surface subject to ice formation and conveying the elliptical ultrasonic waves to the surface.

14. The system of claim 13, wherein the surface is a wing surface.

15. The system of claim 14, wherein the horn is coupled to the wing surface such that the horn is internally mounted on the wing surface.

16. The system of claim 14, wherein the horn is coupled to the wing surface such that the horn is externally mounted on the wing surface.

17. A method of supplying cooling using elliptical ultrasound waves comprising:
    receiving, by a horn via an integrated coolant line, a return of a heated coolant from a heat source; and
    conveying, by the horn, the elliptical ultrasonic waves from a transducer to the heated coolant.

18. The method of claim 17, wherein the transducer comprises at least two actuators.

19. The method of claim 18, wherein the at least two actuators comprises a longitudinal actuator and a bending actuator.

20. The method of claim 17, wherein the transducer generates the elliptical ultrasonic waves with a frequency of at least 20 kHz.

* * * * *